US009049204B2

(12) United States Patent
Bairavasundaram et al.

(10) Patent No.: US 9,049,204 B2
(45) Date of Patent: *Jun. 2, 2015

(54) COLLABORATIVE MANAGEMENT OF SHARED RESOURCES

(71) Applicant: NetApp, Inc., Sunnyvale, CA (US)

(72) Inventors: Lakshmi Narayanan Bairavasundaram, Sunnyvale, CA (US); Gokul Soundararajan, Sunnyvale, CA (US); Vipul Mathur, Bangalore (IN); Kaladhar Voruganti, Sunnyvale, CA (US); Darren Sawyer, San Carlos, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/087,372

(22) Filed: Nov. 22, 2013

(65) Prior Publication Data

US 2014/0223014 A1   Aug. 7, 2014

Related U.S. Application Data

(63) Continuation of application No. 13/251,083, filed on Sep. 30, 2011, now Pat. No. 8,595,346.

(51) Int. Cl.
*H04L 29/08*     (2006.01)
*H04L 12/931*    (2013.01)
*G06F 9/50*      (2006.01)
*H04L 29/14*     (2006.01)
(Continued)

(52) U.S. Cl.
CPC .......... *H04L 67/1023* (2013.01); *H04L 49/505* (2013.01); *H04L 2012/5631* (2013.01); *H04L 2012/5636* (2013.01); *G06F 9/5011* (2013.01);
(Continued)

(58) Field of Classification Search
CPC ............... H04L 2012/5631; H04L 2012/5636; H04L 49/505
USPC ............ 709/223, 224, 226, 229, 221; 726/26; 707/654; 718/1; 370/254
See application file for complete search history.

(56) References Cited

U.S. PATENT DOCUMENTS 6,857,020 B1   2/2005  Chaar et al.
6,917,979 B1 * 7/2005  Dutra et al. ................... 709/229

(Continued)

FOREIGN PATENT DOCUMENTS

WO      2006106142       10/2006
WO    WO 2006/106142 A1  10/2006

OTHER PUBLICATIONS

"PCT International Search Report and Written Opinion PCT/US2012/033944, mailed Jul. 11, 2012", 9 pages.
(Continued)

*Primary Examiner* — Le H Luu
(74) *Attorney, Agent, or Firm* — Gilliam IP PLLC

(57) ABSTRACT

Collaborative management of shared resources is implemented by a storage server receiving, from a first resource manager, notification of a violation for a service provided by the storage server or device coupled to the storage server. The storage server further receives, from each of a plurality of resource managers, an estimated cost of taking a corrective action to mitigate the violation and selects a corrective action proposed by one of the plurality of resource managers based upon the estimated cost. The storage server directs the resource manager that proposed the selected corrective action to perform the selected corrective action.

20 Claims, 7 Drawing Sheets

(51) Int. Cl.
*H04L 12/24* (2006.01)
*H04L 12/70* (2013.01)
*G06F 11/34* (2006.01)
*G06F 3/06* (2006.01)
*G06F 11/20* (2006.01)

(52) U.S. Cl.
CPC ........... *G06F 11/3442* (2013.01); *G06F 3/0605* (2013.01); *G06F 3/0683* (2013.01); H04L 67/1097 (2013.01); H04L 69/40 (2013.01); H04L 41/5009 (2013.01); G06F 11/3495 (2013.01); *G06F 11/2094* (2013.01); *G06F 11/3409* (2013.01); *G06F 2201/81* (2013.01)

(56) References Cited

U.S. PATENT DOCUMENTS

| | | | |
|---|---|---|---|
| 7,076,552 B2 * | 7/2006 | Mandato | 709/226 |
| 2003/0046396 A1 * | 3/2003 | Richter et al. | 709/226 |
| 2003/0093527 A1 | 5/2003 | Rolia | |
| 2003/0120764 A1 * | 6/2003 | Laye et al. | 709/223 |
| 2003/0212778 A1 * | 11/2003 | Collomb | 709/223 |
| 2005/0165925 A1 * | 7/2005 | Dan et al. | 709/224 |
| 2005/0185597 A1 * | 8/2005 | Le et al. | 370/254 |
| 2008/0134176 A1 * | 6/2008 | Fitzgerald et al. | 718/1 |
| 2009/0327458 A1 * | 12/2009 | Liu et al. | 709/221 |
| 2011/0010445 A1 * | 1/2011 | Das et al. | 709/224 |
| 2011/0302659 A1 * | 12/2011 | Branson et al. | 726/26 |
| 2012/0101999 A1 * | 4/2012 | Scherzinger et al. | 707/654 |
| 2013/0086269 A1 | 4/2013 | Bairavasundaram et al. | |

OTHER PUBLICATIONS

PCT International Search Report and Written Opinion, PCT/US2012/033944, mailed Jul. 11, 2012, 9 pp.

* cited by examiner

COLLABORATIVE MANAGEMENT OF SHARED RESOURCES

RELATED APPLICATIONS

This present application is a continuation of co-pending U.S. patent application Ser. No. 13/251,083, filed Sep. 30, 2011, which is assigned to the same assignee as the present application.

FIELD OF THE INVENTION

At least one embodiment of the present invention pertains to data storage systems, and more particularly, to the collaborative management of shared resources within data storage systems.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2011, NetApp, Inc., All Rights Reserved.

BACKGROUND

Various forms of network-based storage systems exist today. These forms include network attached storage (NAS), storage area networks (SAN's), and others. Network-based storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems (clients). The data is stored and retrieved as storage objects, such as blocks and/or files. A block is a sequence of bytes or bits of data having a predetermined length. A file is a collection of related bytes or bits having an arbitrary length. In the context of NAS, a storage server operates on behalf of one or more clients to store and manage file-level access to data. The files may be stored in a storage system that includes one or more arrays of mass storage devices, such as magnetic or optical disks or tapes, by using a data storage scheme such as Redundant Array of Inexpensive Disks (RAID). In a SAN context, a storage server provides clients with block-level access to stored data, rather than file-level access. Some storage servers are capable of providing clients with both file-level access and block-level access, such as certain storage servers made by NetApp, Inc. (NetApp®) of Sunnyvale, Calif.

Requirements associated with the data stored in network-based storage systems relating to expected performance, reliability, etc. are collectively referred to as service-level objectives. Service-level objectives may be specified and managed by an administrator, administrative tool, or both. The number of infrastructure layers managing a storage system has increased significantly over time. Exemplary layers that may have a role in managing a storage system include a storage system layer, network layer, hypervisor layer, cache layer, etc. As a result of this increase in infrastructure layers, performance and reliability of the storage system now depend upon different infrastructure layers. For example, the different infrastructure layers are managed by different people or tools, making it hard to derive unified performance guarantees such as service-level objectives. A variety of techniques are emerging to dynamically tackle changes in workloads, changes in service-level requirements, etc. for individual infrastructure layers. Exemplary techniques include tools that make changes to storage data layouts, dynamically instantiate resources for caching, perform volume migration, perform Logical Interface (LIF) migration, etc. These techniques, however, do not provide an end-to-end approach for storage management that interacts with and manages all infrastructure layers. When multiple tools work independently, they may expend more resources than needed to address a service-level objective and risk the possibility that the tools will counteract each other's efforts, cause an error/unavailability, or cause another service-level objective violation.

For example, data migration can be performed at different infrastructure layers (storage-level, hypervisor-level, etc.) to handle service-level objective violations. Two independent tools may react to the same service-level objective and, unaware of one another, attempt to migrate the same data to different locations. Alternatively, if the two independent tools are concerned with two different sets of data on the same resource, both independent tools may determine that their respective service-level objectives would be met if they were dealing with a less congested resource. Unaware of one another, both independent tools may seek similar corrective solutions by each migrating their own set of data from the first resource to a second resource. More time and effort has been expended in each tool performing data migration as compared to only one tool taking corrective action. Additionally, the independence of the tools carries the risk that both tools have migrated their data to the same second resource and gained no advantage: the second resource is congested rather than the first resource and the respective service-level objectives are still unmet.

SUMMARY

An embodiment of collaborative management of shared resources is implemented by a storage server receiving, from a first resource manager, notification of a violation for a service provided by the storage server or device coupled to the storage server. The storage server further receives, from each of a plurality of resource managers, an estimated cost of taking a corrective action to mitigate the violation and selects a corrective action proposed by one of the plurality of resource managers based upon the estimated cost. In one embodiment, the estimated cost for each proposed corrective action is a normalized cost determined using the amount of a type of resource needed for the corrective action and the amount of available resources of the type of resource. The storage server directs the resource manager that proposed the selected corrective action to perform the selected corrective action.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. References in this specification to "an embodiment," "one embodiment," or the like, mean that the particular feature, structure or characteristic being described is included in at least one embodiment of the present invention. However, occurrences of such phrases in this specification do not necessarily all refer to the same embodiment.

As set forth in further detail below, embodiments of collaborative management of shared resources include a storage server selecting from a plurality of corrective actions proposed by a plurality of resource managers in response to a notification of a violation for a service provided by the storage server or device coupled to the storage server. As a result, different management tools (e.g., from different vendors) collaborate and reduce wasteful use of resources while avoiding conflicts that result from each management tool independently seeking corrective actions. In one embodiment, the estimated cost for each proposed corrective action is a normalized cost determined using the amount of a type of resource needed for the corrective action and the amount of available resources of the type of resource. The use of a normalized cost enables the storage server to effectively compare usage of different kinds of resources.

Figure 1:
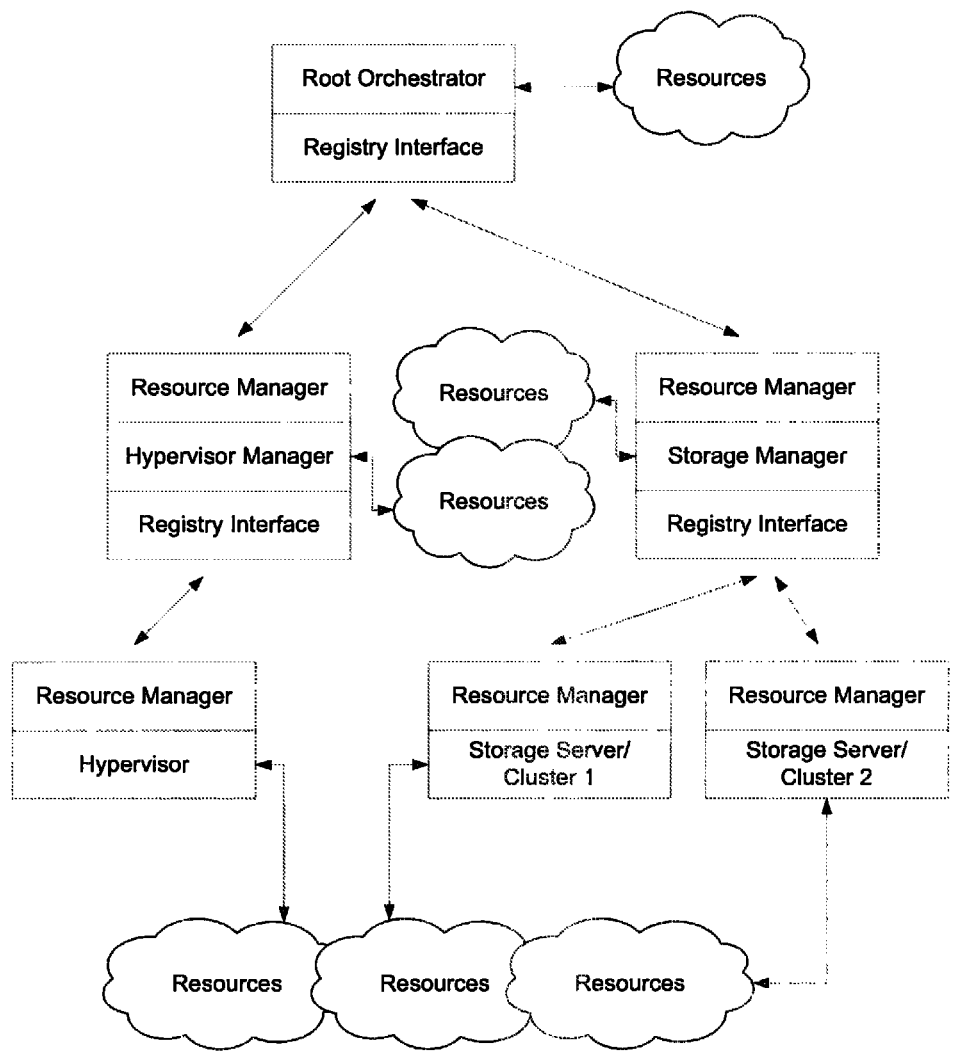
FIG. 1 illustrates a resource management graph representing an embodiment of collaborative management of shared resources.

FIG. 1 illustrates a resource management graph representing an embodiment of collaborative management of shared resources. The different components are management tools or agents for various infrastructure layers and corresponding resources. Exemplary management tools and agents include hypervisor managers, hypervisors (virtual machine managers), server operating system, storage managers, storage server clusters individual storage servers, network managers, data-center orchestrators, etc.

The resources include physical resources, e.g., disk drives and other physical storage, server resources (CPU and memory), network bandwidth, and logical resources, e.g., software and services, virtual machines, data volumes, IP addresses. In one embodiment, the management of logical resources includes invoking other resource managers or indirectly managing physical resources. Some of the resources in FIG. 1 are illustrated as overlapping one another. For example, storage server/cluster 1 and storage server/cluster 2 may both have access to the same disk drive. In one embodiment, the resources available to each of the components overlap with one or more of the resources available to at least one other component. Alternatively, a component may have exclusive access to a set of resources. The illustration of overlap between some of the resources is exemplary and other configurations of overlapping or non-overlapping resources may be implemented.

The graph includes a number of components that expose one or both of a registry interface and a resource manager interface. These interfaces enable various components to be linked to one another. The resource manager interface serves to register a component with the registry interface of another component. The root orchestrator is linked to instances of a hypervisor manager and a storage manager. Although the root orchestrator and storage manager are illustrated separately, in one embodiment, the root orchestrator and storage manager are implemented in a single device, e.g., a storage management server. The hypervisor manager is linked to a hypervisor and the storage manager is linked to storage server/cluster 1 and storage server/cluster 2. Each component may be linked to a greater or lesser number of other components than illustrated. The root orchestrator is the root node of the graph and, therefore, has a registry interface but does not include a resource manager interface. In a similar fashion, the illustrated hypervisor, storage server/cluster 1, and storage server/cluster 2 are sink nodes and include resource manager interfaces but do not include registry interfaces. In one embodiment, the root orchestrator is the primary point of interaction for an administrator.

In one embodiment, collaborative management of shared resources utilizes a register approach in which resource managers of lower-level components register with a higher-level component registry interface. In an alternate embodiment, collaborative management of shared resources utilizes a discover approach in which higher-level components with a registry interface query the network for resource managers or have configured links to resource managers. In yet another embodiment, a combination of the register and discover approaches is utilized.

In one embodiment, during registration, a resource manager interface transmits information relevant to the management of shared resources to the registry interface of a higher-level component. Exemplary registration information includes one or more of the following: the type of resources the component manages, how the component can be contacted (e.g., an IP address or port number), the set of corrective actions that are supported for a resource, a normalized cost estimate for a corrective action, if workload and service level objective monitoring is available, the set of workload and service level objective characteristics that can be monitored, workload and service level objective characteristics needed by the resource manager to make resource management decisions (e.g., that are not tracked by the component), a set of incoming data protocols (such as Network File System, Common Internet File System, Internet Small Computer System Interface, etc.) that can be handled by a resource, and the set of outgoing data protocols expected downstream. Each registry interface of a higher-level component stores the registry information received from corresponding lower-level resource managers for use in the collaborative management and, in particular, in the determination and delegation of corrective actions. In one embodiment, the registration information provided by a resource manager includes registration information received by that component's registry interface from a lower-level component. Alternatively, the registration information provided by a resource manager only corresponds to the resources, actions, etc. directly available to that particular component.

Exemplary workload characteristics include a read/write ratio and a working set size. Exemplary service level objectives include latency and throughput requirements. In one embodiment, the resource manager of a component indicates objective characteristics that can be monitored but does not monitor them until instructed to do so by a higher-level component.

Exemplary corrective actions include the creation of a resource, modification of an existing resource, the deletion of a resource, and the reversal of a previous corrective action. For example, if the flow of data or the speed at which requests are processed fails to meet an objective, a component may instantiate a cache to increase the flow of data or processing speed of requests. In one embodiment, when an existing resource is modified or created, the resource manager sets a new or updated normalized cost threshold to be maintained and monitored during the management of that resource. In one embodiment, when a registry interface directs a resource manager to perform a corrective action, the resource manager performs the corrective action and replies with the normalized cost of performing the corrective action.

In one embodiment, during the registration of corrective actions available to the resource manager of a component, the resource manager includes one or more of the following: the type of resource to which a corrective action applies, the type of corrective action (e.g., reconfiguring an existing resource, instantiating a new resource, modifying a data path, etc.), the estimated normalized cost of the corrective action, the time scale at which the corrective action operates e.g., minutes, hours, or days), and whether or not the corrective action is reversible.

Figure 2:
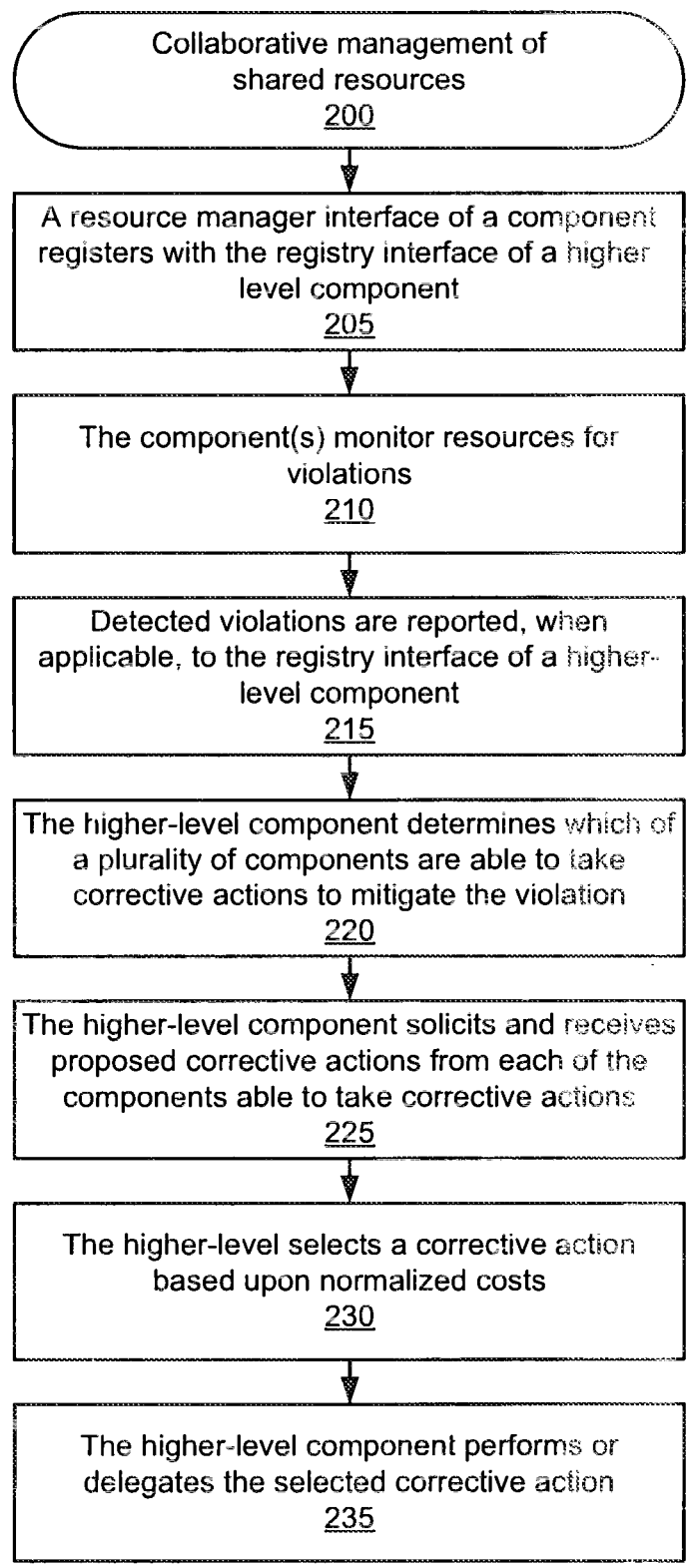
FIG. 2 is an exemplary method of collaborative management of shared resources.

FIG. 2 is an exemplary method 200 of collaborative management of shared resources. At procedural block 205, a resource manager interface of a component registers with the registry interface of a higher-level component as described above. For example, the resource manager interlace of the storage server/cluster 1 registers with the registry interface of the storage manager. At procedural block 210, the component monitors its resources for a violation of a service provided by a storage server or device coupled to the storage server (e.g., a workload or service level objective or the cost of a previously implemented corrective action). For example, the storage server/cluster 1 monitors the service level objectives for a data volume stored on its disk drives.

Exemplary violations include reaching/exceeding/falling below a threshold of used storage space, I/O latency, I/O operations per second, available bandwidth, workload priority, number of failures, a recovery point objective, a recovery time objective, access protection, data retention time, secure deletion, a percentage of I/O requests that are read requests, a percentage of read requests that are random read requests, a percentage of write requests that are random write requests, the size of I/O requests, and the working set size. In one embodiment, a violation occurs when a previously implemented corrective action fails to perform at a particular cost threshold, which indicates that a different corrective action may be preferable.

At procedural block 215, the component, when it detects a violation, reports the violation to the registry interface of a higher-level component. For example, the storage server/cluster 1 detects that the data volume has exceeded a storage space threshold, exceeds an I/O latency threshold, etc. and reports the violation to the storage manager. The higher-level component may, in turn, report the violation up another level. For example, the storage manager can report the violation to the root orchestrator. In one embodiment, components decide whether to report the violation to a higher-level components based on whether the violation is too extreme to handle at this level (e.g., using a threshold), whether or not it has or lower-level components have techniques to handle the violation (e.g., based on registered corrective actions), or whether the cost of corrective action is below a threshold. In one embodiment, the components always report the violation to a higher-level for informational purposes and, when appropriate, including a notification of the level at which the violation is being corrected, thereby allowing higher-level components to detect duplicate actions. If there is no higher-level component, the violation is handled by the component that detected the violation. For example, if the root orchestrator detects a violation, there is no higher-level component to which to report the violation. In one embodiment, the higher-level component determines if the violation was detected by more than one resource manager, e.g., by sending information about the violation and an identification of the resource to other components that manage that resource.

At procedural block 220, the higher-level component determines which of a plurality of components are able to take corrective action to mitigate the violation. For example, the storage manager determines which of storage server/cluster 1, storage server/cluster 2, and itself is able to take corrective action to mitigate the violation. If the storage manager reported the violation to the root orchestrator, the root orchestrator would determine which of the hypervisor manager, the storage manager, and itself is able to take corrective action to mitigate the violation. In one embodiment, this determination is based upon information gathered during registration (as described above). Exemplary corrective actions include workload throttling, virtual machine disk migration, cache allocation, virtual storage appliance cache allocation, disk scheduling, cluster admission control, buffer-cache allocation, flash and solid-state drive cache allocation, volume migration, logical interface migration, and deduplication.

In one embodiment, in determining which components are able to take corrective actions, the higher-level component considers components multiple levels beneath it. For example, the root orchestrator considers the corrective abilities of the hypervisor as well as the corrective abilities of the hypervisor manager.

In one embodiment, the determination of which components are able to take corrective actions includes the higher-level component issuing a request to lower-level components to indicate which of their managed resources compete with the resource experiencing a violation. For example, an aggregate is often divided into logical volumes. Given that two logical volumes exist within the same physical storage space, a violation in a first logical volume may be mitigated by taking a corrective action in a second logical volume.

At procedural block 225, the higher-level component solicits and receives proposed corrective actions from each of the components determined to be able to take corrective actions. In one embodiment, the higher-level component proposes a corrective action as well. In one embodiment, components propose corrective actions that they are able to delegate to other components.

In one embodiment, the estimated cost for each proposed corrective action is a normalized cost determined using the amount of a type of resource needed for the corrective action and the amount of available resources of the type of resource, e.g., by dividing the amount of a type of resource needed by the amount of spare resources of that type. Alternatively, the estimated cost is normalized in another manner, e.g., by giving priority to a corrective action that utilizes one type of resource over a corrective action that utilizes a different type of resource or applying a multiplier to the normalized cost based upon resource type. In yet another embodiment, the estimated cost provided by a lower-level component is in the form of an equation or variable that accounts for information that was not available to the lower-level component.

In one embodiment, a component has multiple corrective actions it may take to mitigate the violation. In one embodiment, the component uses a normalized cost to determine which corrective action to send to the component that requesting proposed corrective actions. Alternatively, the component sends multiple corrective actions to the component that is requesting proposed corrective actions.

In one embodiment, a higher-level component requests the lower-level component to test a corrective action to determine the feasibility and cost of taking said corrective action. For example, the registry of the higher-level provides the resource manager of a lower-level component with one or more of the following: the type of resource, the type of corrective action, the objective to be met, the current state of the objective (e.g., that caused the violation), and workload characteristics needed by the resource manager.

At procedural block 230, the higher-level component selects a corrective action based upon the normalized costs of each of the proposed corrective actions. In one embodiment, the higher-level component selects the corrective action with the lowest normalized cost. In an alternate embodiment, the higher-level component additionally includes a prioritization of certain resources or resource types or applies a multiplier based upon resource type to the received normalized costs prior to making the selection. At procedural block 235, the higher-level component performs the selected corrective action or delegates the selected corrective action to the component that proposed the selected corrective action.

Figure 3:
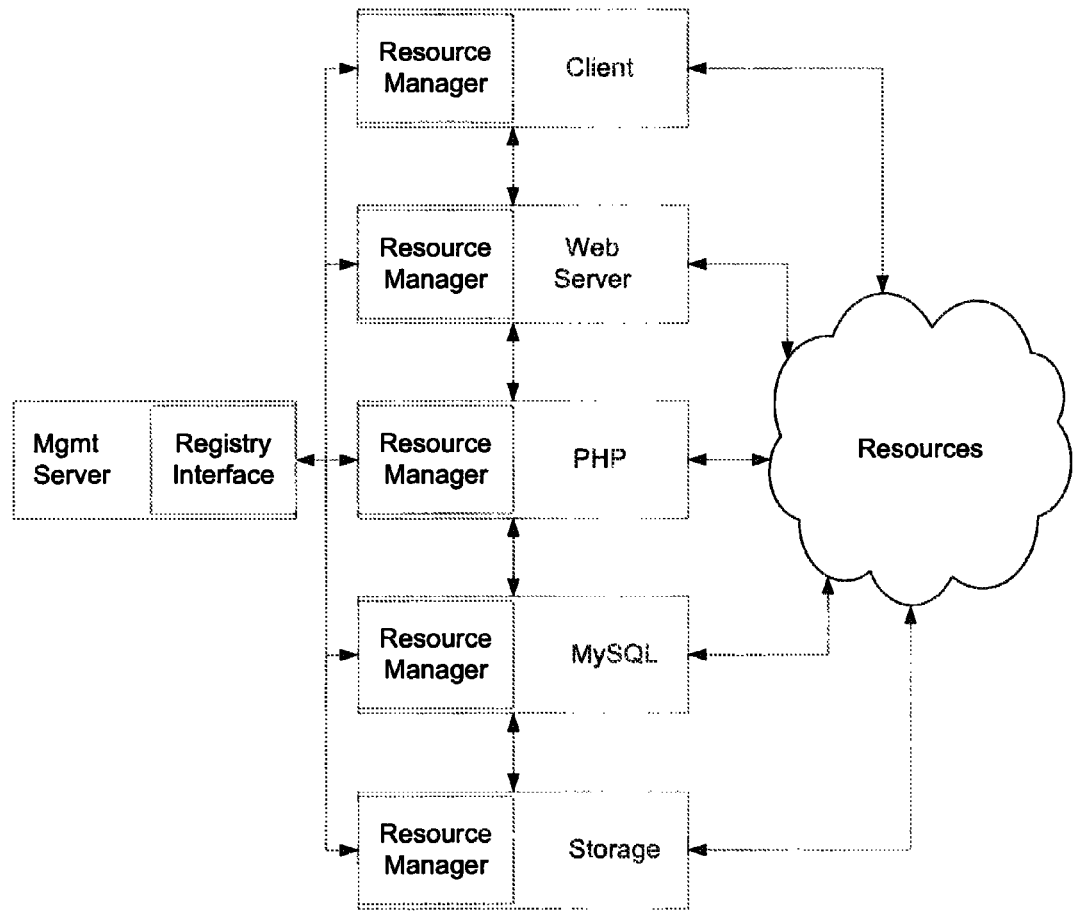
FIG. 3 illustrates an alternate framework in which collaborative management of shared resources may be implemented.

FIG. 3 illustrates an alternate framework in which collaborative management of shared resources may be implemented. Instead of being implemented in a storage server system, collaborative management of shared resources is implemented in a cloud-computing, web server, or application server environment. Similar to the description related to FIGS. 1 and 2, each of the client layer, web server layer, PHP layer, a MySQL layer, and a storage layer includes a resource manager and, when possible, registers with the registry interface of a management server. In one embodiment, the resource manager of each layer registers with a registry interface of an adjacent layer. In one embodiment, the layers register according to a register approach. Alternatively, the layers register according to a discover approach or a combination of the two approaches. The layers collectively have access to a plurality of overlapping and or exclusive resources. In one embodiment more than one layer accesses the same resource.

Exemplary resources include tools to manipulate the flow of data and computation. For example, if one layer detects that the flow of data has failed to meet a threshold, it reports the violation to the management server. The management server determines which of the plurality of layers are able to take corrective actions, solicits and receives proposed corrective actions from the determined layers, and selects a corrective action based upon a normalized cost.

Figure 4A:
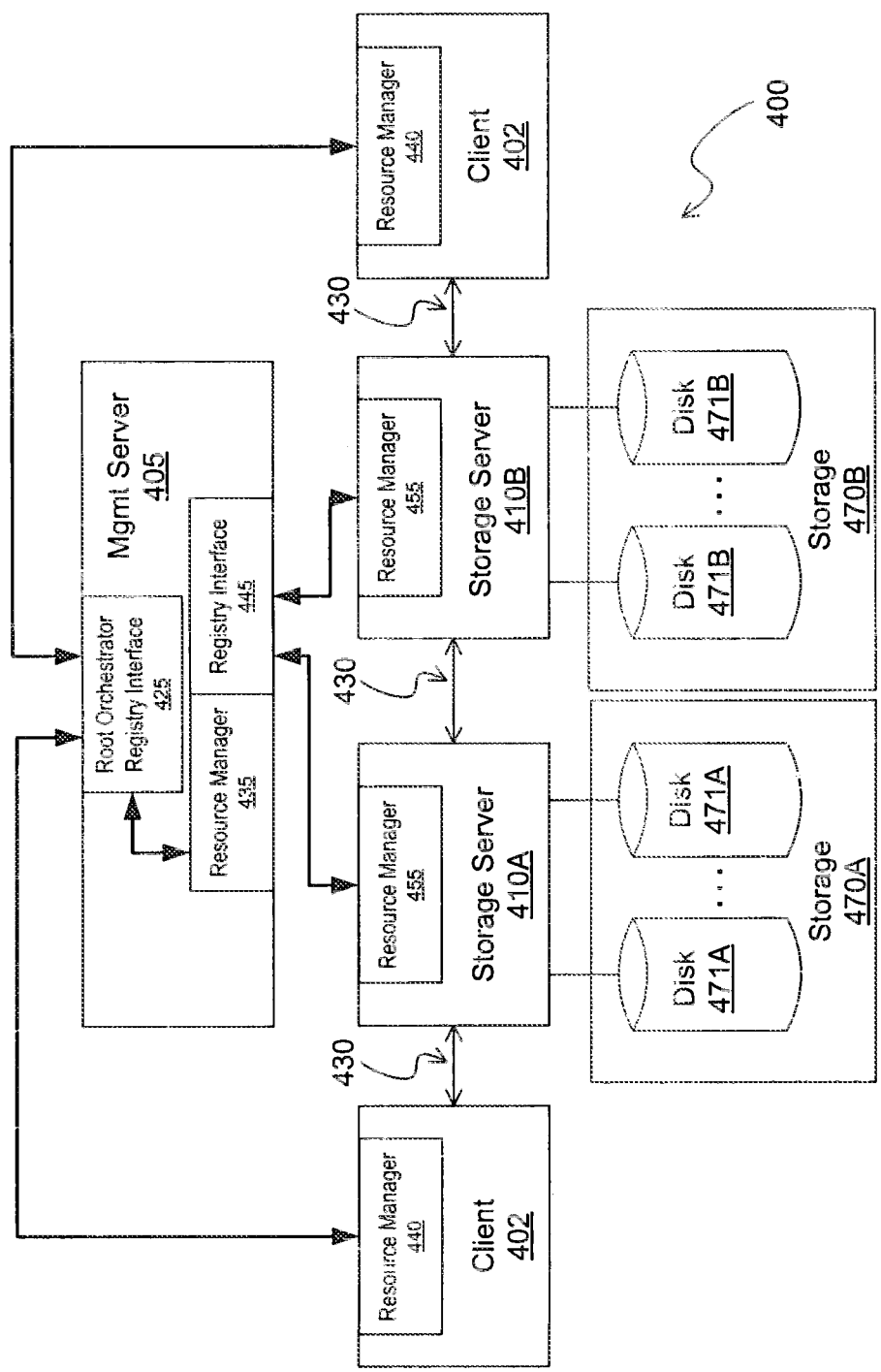
FIG. 4A illustrates a network storage system in which collaborative management of shared resources may be implemented.

FIG. 4A shows a network storage system 400 in which collaborative management of shared resources can be implemented. A management server 405 manages one or more storage servers 410. Storage servers 410 (storage servers 410A, 410B) each manage multiple storage units 470 (storage 470A, 470B) that include mass storage devices. These storage servers 410 provide data storage services to one or more clients 402 through a network 430. Network 430 may be, for example, a local area network (LAN), wide area network (WAN), metropolitan area network (MAN), global area network (GAN) such as the Internet, a Fibre Channel fabric, or any combination of such interconnects. Each of clients 402 may be, for example, a conventional personal computer (PC), server-class computer, workstation, handheld computing or communication device, a virtual machine, or other special or general purpose computer.

Storage of data in storage units 470 is managed by storage servers 410 which receive and respond to various I/O requests from clients 402, directed to data stored in or to be stored in storage units 470. Data is accessed (e.g., in response to the I/O requests) in units of blocks, which in the present embodiment are 4 KB in size, although other block sizes (e.g., 512 bytes, 2 KB, 8 KB etc.) may also be used. For one embodiment, 4 KB as used herein refers to 4,096 bytes. For an alternate embodiment, 4 KB refers to 4,000 bytes. Storage units 470 constitute mass storage devices which can include, for example, flash memory, magnetic or optical disks, or tape drives, illustrated as disks 471 (471A, 471B). The storage devices 471 can further be organized into arrays (not illustrated) implementing a Redundant Array of Inexpensive Disks/Devices (RAID) scheme, whereby storage servers 410 access storage units 470 using one or more RAID protocols. RAID is a data storage scheme that divides and replicates data among multiple hard disk drives—e.g., in stripes of data. Data striping is the technique of segmenting logically sequential data, such as a single file, so that segments can be assigned to multiple physical devices/hard drives. Redundant (parity) data is stored to allow problems to be detected and possibly fixed. For example, if one were to configure a hardware-based RAID-5 volume using three 250 GB hard drives (two drives for data, and one for parity), the operating system would be presented with a single 500 GB volume and the exemplary single file may be stored across the two data drives. Although illustrated as separate components, for one embodiment, a storage server 410 and storage unit 470 may be a part of/housed within a single device.

Storage servers 410 can provide file-level service such as used in a network-attached storage (NAS) environment, block-level service such as used in a storage area network (SAN) environment, a service which is capable of providing both file-level and block-level service, or any other service capable of providing other data access services. Although storage servers 410 are each illustrated as single units in FIG. 4A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG.

4B and embodiments of a D-module and an N-module are described further below with respect to FIG. 6.

In yet other embodiments, storage servers 410 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, etc., provided, for example, on archive, backup, or secondary storage server connected to a primary storage server. A network storage subsystem can also be implemented with a collection of networked resources provided across multiple storage servers and/or storage units.

In the embodiment of FIG. 4A, one of the storage servers (e.g., storage server 410A) functions as a primary provider of data storage services to client 402. Data storage requests from client 402 are serviced using disks 471A organized as one or more storage objects. A secondary storage server (e.g., storage server 410B) takes a standby role in a mirror relationship with the primary storage server, replicating storage objects from the primary storage server to storage objects organized on disks of the secondary storage server (e.g., disks 470B). In operation, the secondary storage server does not service requests from client 402 until data in the primary storage object becomes inaccessible such as in a disaster with the primary storage server, such event considered a failure at the primary storage server. Upon a failure at the primary storage server, requests from client 402 intended for the primary storage object are serviced using replicated data (i.e. the secondary storage object) at the secondary storage server.

In one embodiment, the corresponding collaborative management architecture is found in the management server 405 and one or more of the components of each storage server 410. In one embodiment, the collaborative management architecture is also found in one or more clients 402 or in a separate physical or virtual server/machine in communication with a storage server 410. Accordingly, the various resource managers and registry interfaces described herein are implemented by one or more computing devices within the network storage system 400. For example, in one embodiment, the management sever 405 includes a root orchestrator registry interface 425 in communication with the management server resource manager 435 as well as the resource manager 440 in each of one or more clients 402. The management server 405 further includes a storage management registry interface 445 that is in communication with each resource manager 455 of one or more storage servers 410. In an alternative embodiment, the root orchestrator registry interface is embodied outside of the management server 405, e.g., in a client 402 or in its own device.

It will be appreciated that in other embodiments, network storage system 400 may include more than two storage servers. In these cases, protection relationships may be operative between various storage servers in system 400 such that one or more primary storage objects from storage server 410A may be replicated to a storage server other than storage server 410B (not shown in this figure). Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 410 should be taken as illustrative only.

Figure 4B:
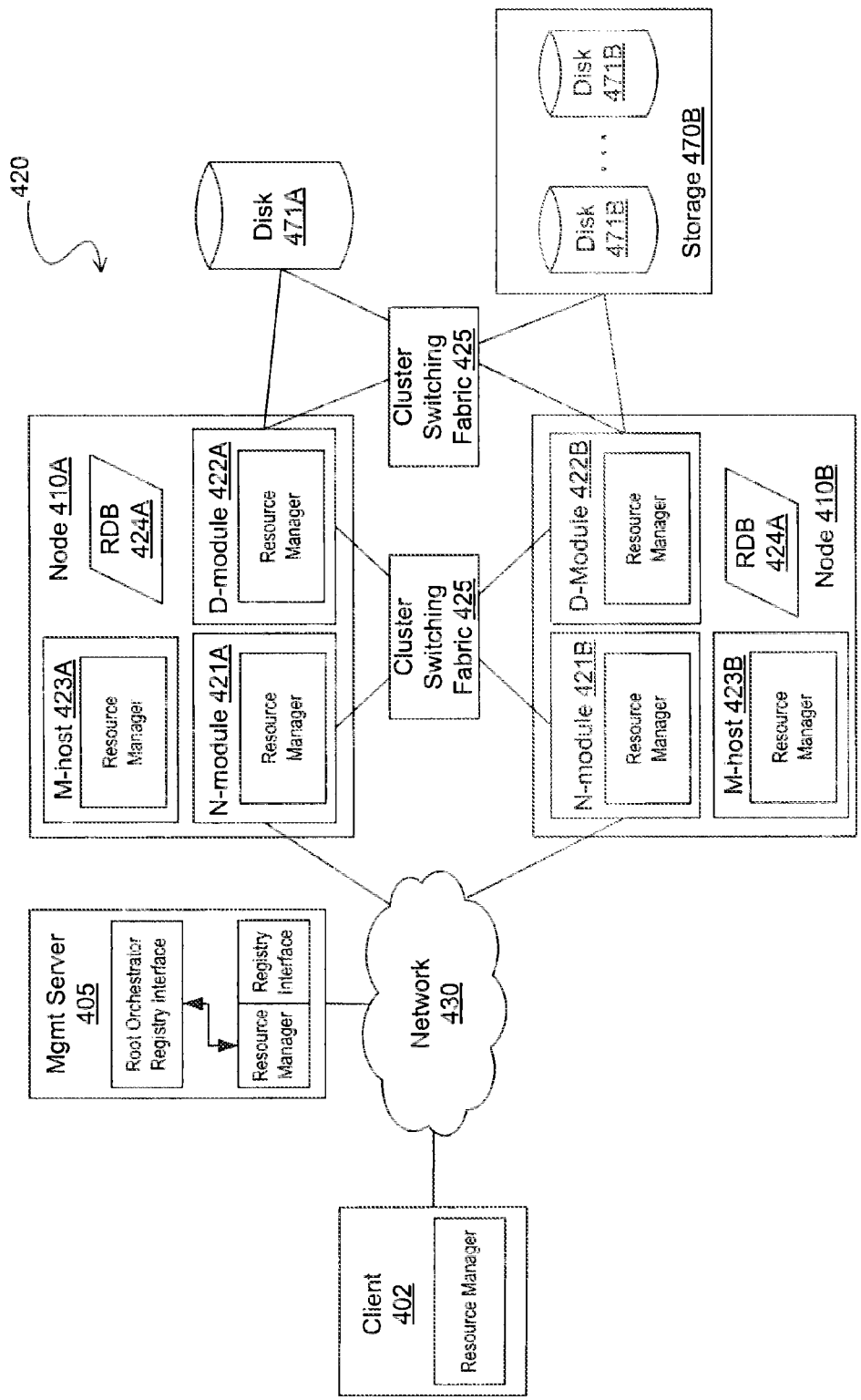
FIG. 4B illustrates a distributed or clustered architecture for a network storage system in which collaborative management of shared resources may be implemented in an alternative embodiment.

FIG. 4B illustrates a block diagram of a distributed or clustered network storage system 420 which may implement rapid cloning in one embodiment. System 420 may include storage servers implemented as nodes 410 (nodes 410A, 410B) which are each configured to provide access to storage devices 471. In FIG. 4B, nodes 410 are interconnected by a cluster switching fabric 425, which may be embodied as an Ethernet switch.

Nodes 410 may be operative as multiple functional components that cooperate to provide a distributed architecture of system 420. To that end, each node 410 may be organized as a network element or module (N-module 421A, 421B), a disk element or module (D-module 422A, 422B), and a management element or module (M-host 423A, 423B). As described above, collaborative management of shared resources is built upon the coordinated efforts of multiple components. As discussed above, in one embodiment, the corresponding collaborative management architecture is found in one or more of the components of each node 410. For example, each N-module 421, D-module 422, and M-host 423 may include a resource manager. In one embodiment, one or more of the N-module 421, D-module 422, and M-host 423 further includes a registry interface. In one embodiment, the collaborative management architecture is also found in one or more clients 402 and a management server 405 as described above.

In one embodiment, each module includes a processor and memory for carrying out respective module operations. For example, N-module 421 may include functionality that enables node 410 to connect to client 402 via network 430 and may include protocol components such as a media access layer, Internet Protocol (IP) layer. Transport Control Protocol (TCP) layer, User Datagram Protocol (UDP) layer, and other protocols known in the art. In contrast, D-module 422 may connect to one or more storage devices 471 via cluster switching fabric 425 and may be operative to service access requests on devices 470. In one embodiment, the D-module 422 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 4B, a storage abstraction layer (e.g., the system) of the D-module divides the physical storage of devices 470 into storage objects. Requests received by node 410 (e.g., via N-module 421) may thus include storage object identifiers to indicate a storage object on which to carry out the request.

Also operative in node 410 is M-host 423 which provides cluster services for node 410 by performing operations in support of a distributed storage system image, for instance, across system 420. M-host 423 provides cluster services by managing a data structure such as a RDB 424 (RDB 424A, RDB 424B) which contains information used by N-module 421 to determine which D-module 422 "owns" (services) each storage object. The various instances of RDB 424 across respective nodes 410 may be updated regularly by M-host 423 using conventional protocols operative between each of the M-hosts (e.g., across network 430) to bring them into synchronization with each other. A client request received by N-module 421 may then be routed to the appropriate D-module 422 for servicing to provide a distributed storage system image.

It should be noted that while FIG. 4B shows an equal number of N- and D-modules constituting a node in the illustrative system, there may be different number of N- and D-modules constituting a node in accordance with various embodiments of rapid cloning. For example, there may be a number of N-modules and D-modules of node 410A that does not reflect a one-to-one correspondence between the N- and D-modules of node 410B. As such, the description of a node comprising one N-module and one D-module for each node should be taken as illustrative only.

Figure 5:
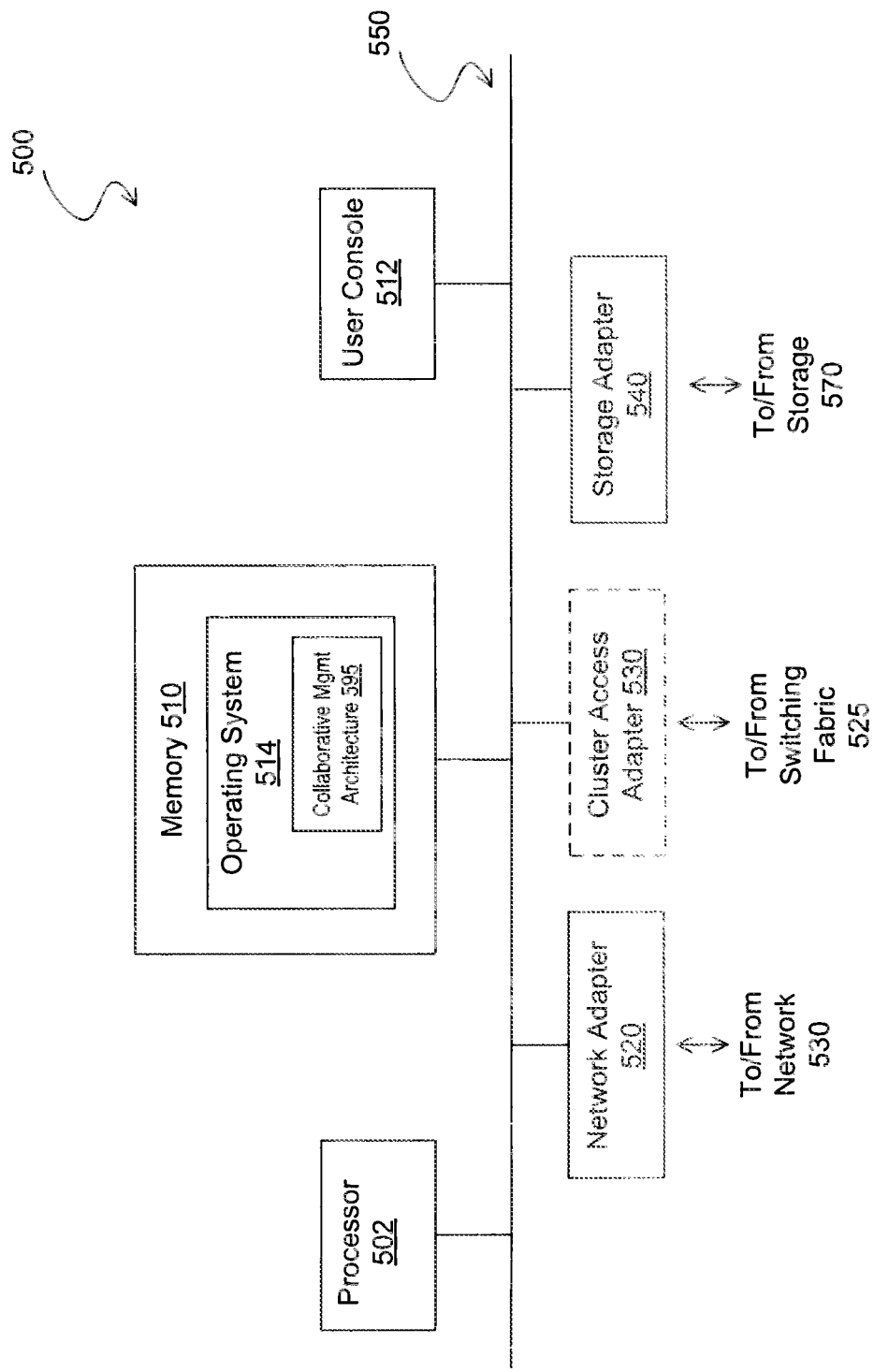
FIG. 5 is a block diagram of an illustrative embodiment of the hardware architecture of a storage server in which collaborative management of shared resources may be implemented.

FIG. 5 is a block diagram of an embodiment of a server, such as management server 405 or storage servers 410A and 410B of FIG. 4A, embodied as a general or special purpose computer including a processor 502, a memory 510, a network adapter 520, a user console 512 and a storage adapter 540 interconnected by a system bus 550, such as a convention Peripheral Component Interconnect (PCI) bus. Certain standard and well-known components, which are not germane to the understanding of embodiments of the present invention, are not shown.

The processor 502 is the central processing unit (CPU) of the storage server 410 and, thus, control its overall operation. The processor 502 accomplishes this by executing software stored in memory 510. For one embodiment, multiple processors 502 or one or more processors 502 with multiple cores are included in the storage server 410. For one embodiment, individual adapters (e.g., network adapter 520 and storage adapter 540) each include a processor and memory for carrying out respective module operations.

Memory 510 includes storage locations addressable by processor 502, network adapter 520 and storage adapter 540 for storing processor-executable instructions and data structures associated with implementation of collaborative management of shared resources. Storage operating, system 514, portions of which are typically resident in memory 510 and executed by processor 502, functionally organizes the storage server 410 by invoking operations in support of the storage services provided by the storage server 410. It will be apparent to those skilled in the art that other processing means may be used for executing instructions and other memory means, including various computer readable media, may be used for storing program instructions pertaining to the inventive techniques described herein. It will also be apparent that some or all of the functionality of the processor 502 and executable software can be implemented by hardware, such as integrated currents configured as programmable logic arrays. ASICs, and the like.

Network adapter 520 comprises one or more ports to couple the storage server to one or more clients over point-to-point links or a network. Thus, network adapter 520 includes the mechanical, electrical and signaling circuitry needed to couple the storage server to one or more client over a network. The network adapter 520 may include protocol components such as a Media Access Control (MAC) layer. Common Internet File System (CIFS), Network File System (NFS), Internet Protocol (IP) layer. Transport Control Protocol (TCP) layer. User Datagram Protocol (UDP) layer, and other protocols known in the art for facilitating such connectivity. Each client may communicate with the storage server over the network by exchanging discrete frames or packets of data according to pre-defined protocols, such as TCP/IP.

Storage adapter 340 includes a plurality of ports having input/output (I/O) interface circuitry to couple the storage devices (e.g., disks) to bus 521 over an I/O interconnect arrangement, such as a conventional high-performance, FC or SAS link topology. Storage adapter 540 typically includes a device controller (not illustrated) comprising a processor and a memory for controlling the overall operation of the storage units in accordance with read and write commands received from storage operating system 514. In one embodiment, the storage operating system 514 implements collaborative management of shared resources 595, as described above. For example, the implementation of collaborative management of shared resources 595 may include a registry interface, a resource manager, or a combination of both a registry interlace and a resource manager as described above with reference to a root orchestrator, management server, storage server, etc. As used herein, data written by a device controller in response to a write command is referred to as "write data," whereas data read by device controller responsive to a read command is referred to as "read data."

User console 512 enables an administrator to interface with the storage server to invoke operations and provide inputs to the storage server using a command line interface (CLI) or a graphical user interface (GUI). In one embodiment, user console 512 is implemented using a monitor and keyboard.

When implemented as a node of a cluster, such as cluster 420 of FIG. 4B, the storage server further includes a cluster access adapter 530 (shown in phantom/broken lines) having one or more ports to couple the node to other nodes in a cluster. In one embodiment, Ethernet is used as the clustering protocol and interconnect media, although it will be apparent to one of skill in the art that other types of protocols and interconnects can by utilized within the cluster architecture.

Figure 6:
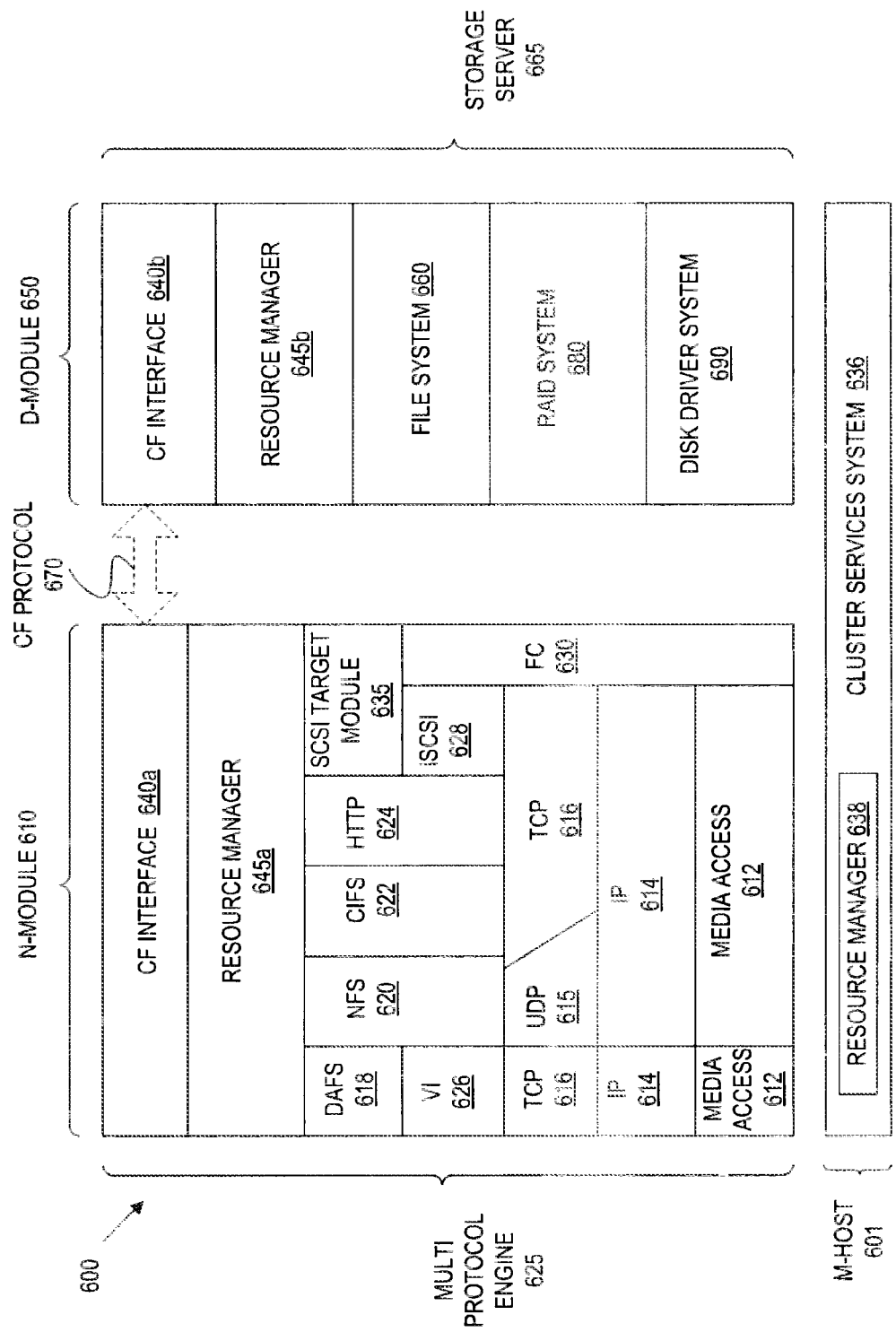
FIG. 6 illustrates an embodiment of the storage operating system of FIG. 5 in which collaborative management of shared resources may be implemented.

FIG. 6 is a block diagram of a storage operating system 600, such as storage operating system 514 of FIG. 5, that implements an embodiment of collaborative management of shared resources. The storage operating system comprises a series of software layers executed by a processor, such as processor 502 of FIG. 5, as organized to form an integrated network protocol stack or, more generally, a multi-protocol engine 625 that provides data paths for clients to access information stored on the storage server using block and file access protocols. In one embodiment, collaborative management of shared resources is implemented in one or more layers of the storage operating system 600.

Multi-protocol engine 625 includes a media access layer 612 of network drivers (e.g., gigabit Ethernet drivers) that interface with network protocol layers, such as the IP layer 614 and its supporting transport mechanisms, the TCP layer 616 and the User Datagram Protocol (UDP) layer 615. A file system protocol layer provides multi-protocol file access and, to that end, includes support for one or more of the Direct Access File System (DAFS) protocol 618, the NFS protocol 620, the CIFS protocol 622 and the Hypertext Transfer Protocol (HTTP) protocol 624. A VI layer 626 implements the VI architecture to provide direct access transport (DAT) capabilities, such as RDMA, as required by the DAFS protocol 618. An iSCSI driver layer 628 provides block protocol access over the TCP/IP network protocol layers, while a FC driver layer 630 receives and transmits block access requests and responses to and from the storage server. In certain cases, a Fibre Channel over Ethernet (FCoE) layer (not shown) may also be operative in multi-protocol engine 625 to receive and transmit requests and responses to and from the storage server. The FC and iSCSI drivers provide respective FC- and iSCSI-specific access control to the blocks and, thus, manage exports of luns to either iSCSI or FCP or, alternatively, to both iSCSI and FCP when accessing data blocks on the storage server.

The storage operating system also includes a series of software layers organized to form a storage server 665 that provides data paths for accessing information stored on storage devices. Information may include data received from a client, in addition to data accessed by the storage operating system in support of storage server operations such as program application data or other system data. Preferably, client data may be organized as one or more logical storage objects (e.g., volumes) that comprise a collection of storage devices cooperating to define pan overall logical arrangement. In one embodiment, the logical arrangement may involve logical volume block number (VBN) spaces, wherein each volume is associated with a unique VBN.

The file system 660 implements a virtualization system of the storage operating system through the interaction with one or more virtualization modules (illustrated as a SCSI target module 635). The SCSI target module 635 is generally disposed between drivers 628, 630 and the file system 660 to provide a translation layer between the data block (lun) space and the file system space, where luns are represented as data blocks. In one embodiment, the file system 660 implements a WAFL file system having an on-disk format representation that is block-bayed using, e.g., 4 KB blocks and using a data structure such as index nodes ("inodes") to identify files and file attributes (such as creation time, access permissions, size and block location). File system 660 uses files to store metadata describing the layout of its file system, including an inode file, which directly or indirectly references (points to) the underlying, data blocks of a file.

Operationally, a request from a client is forwarded as a packet over the network and onto the storage server where it is received at a network adapter. A network driver such as layer 612 or layer 630 processes the packet and, if appropriate, passes it on to a network protocol and file access layer for additional processing prior to forwarding to file system 660. There, file system 660 generates operations to load (retrieve) the requested data from the disks if it is not resident "in core", i.e., in memory 310. For one embodiment, the file system 660 passes the PVBN to the RAID system 680. There, the PVBN is mapped to a disk identifier and device block number (disk, DBN) and sent to an appropriate driver of disk driver system 690. The disk driver accesses the DBN from the specified disk and loads the requested data block(s) in memory for processing by the storage server. Upon completion of the request, the node (and operating system 600) returns a reply to the client over the network.

It should be noted that the software "path" through the storage operating system layers described above needed to perform data storage access for the client request received at the storage server adaptable to the teachings of the invention may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by the storage server in response to a request issued by a client. Moreover, in another alternate embodiment of the invention, the processing elements of adapters 520, 540 may be configured to offload some or all of the packet processing and storage access operations, respectively, from processor 502, to thereby increase the performance of the storage service provided by the storage server. It is expressly contemplated that the various processes, architectures and procedures described herein can be implemented in hardware, firmware or software.

When implemented in a cluster, data access components of the storage operating system may be embodied as D-module 650 for accessing data stored on disk. In contrast, multi-protocol engine 625 may be embodied as N-module 610 to perform protocol termination with respect to a client issuing incoming access over the network, as well as to redirect the access requests to any other N-module in the cluster. A cluster services system 636 may further implement an M-host (e.g. M-host 601) to provide cluster services for generating information sharing operations to present a distributed file system image for the cluster. For instance, media access layer 612 may send and receive information packets between the various cluster services systems of the nodes to synchronize the replicated databases in each of the nodes. In one embodiment, each of the N-Module 610, D-Module 650, and M-Host 601 implements a resource manager in communication with one or more registry interfaces as described above. For example, the resource manager 645*a* in the N-Module interacts with one or more of the layers within the N-Module 610. In one embodiment, the resource manager 645*a* in the N-Module interacts with one or more of NFS 620, CIFS 622, HTTP 624, iSCSI 628, and FC 630. The resource manager 645*b* interacts with one or more of the file system 660, the RAID system 680, and the disk driver system 690.

In addition, a cluster fabric (CF) interface module 640 (CF interface modules 640A, 640B) may facilitate intra-cluster communication between N-module 610 and D-module 650 using a CF protocol 670. For instance, D-module 650 may pose a CF application programming interface (API) to which N-module 610 (or another D-module not shown) issues calls. To that end, CF interface module 640 can be organized as a CF encoder/decoder using local procedure calls (LPCs) and remote procedure calls (RPCs) to communicate a file system command to between D-modules residing on the same node and remote nodes, respectively.

Although embodiments of the present invention are shown herein to implement collaborative management of shared resources within the illustrated components and layers of a storage server, it will be appreciated that collaborative management of shared resources may be implemented in other modules or components of the storage server or other physical or virtual servers in other embodiments. In addition, collaborative management of shared resources may be implemented as one or a combination of a software-executing processor, hardware or firmware within the storage server. As such, collaborative management of shared resources may directly or indirectly interface with modules of the storage operating system in accordance with teachings of the present invention.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server or storage serving appliance) or general-purpose computer, including a standalone computer or portion thereof embodied as or including a storage system. Moreover, the teachings of this invention can be adapted to a variety of storage system architectures including, but not limited to a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including conventional write-in-place file systems.

Thus, embodiments of collaborative management of shared resources are implemented in a computer system as described herein. In practice, the method 200 may constitute one or more programs made up of computer-executable instructions. The computer-executable instructions may be written in a computer programming language, e.g., software, or may be embodied in firmware logic or in hardware circuitry. The computer-executable instructions to implement collaborative management of shared resources may be stored on a machine-readable storage medium. A "computer-readable storage medium," or a "non-transitory computer-readable storage medium," as the terms are used herein, include any mechanism that provides (i.e., stores and/or transmits) information in a form accessible by a machine (e.g., a computer, network device, personal digital assistant (PDA), manufacturing tool, any device with a set of one or more processors, etc.). A "non-transitory computer-readable storage medium," as the term is used herein, does not include a signal, carrier wave, etc. The term RAM as used herein is intended to encompass all volatile storage media, such as dynamic random a memory (DRAM) and static RAM (SRAM). Computer-executable instructions can be stored on non-volatile storage devices, such as magnetic hard disk, an optical disk, and are typically written, by a direct memory access process, into RAM/memory during execution of software by a processor. One of skill in the art will immediately recognize that the terms "machine-readable storage medium" and "computer-readable storage medium" include any type of volatile or non-volatile storage device that is accessible by a processor. For example, a machine readable storage medium includes recordable/non-recordable media (e.g., read-only memory (ROM); random access memory (RAM); magnetic disk storage media; optical storage media; flash memory devices; etc.).

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Therefore, it is manifestly intended that embodiments of this invention be limited only by the following claims and equivalents thereof.

What is claimed is:

1. A computer-implemented method comprising:
   determining, by one or more processors of a computing system, that a violation of a service level objective has occurred, wherein the service level objective is associated with one or more computing resources;
   determining a plurality of resource managers available to perform a corrective action, wherein each of the plurality of resource managers is communicatively coupled;
   determining one or more corrective actions available to one or more of the plurality of resource managers;
   selecting a corrective action of the one or more corrective actions;
   selecting a first of the resource managers to perform the action; and
   indicating, to the first of the resource managers, that the first of the resource managers should perform the action.

2. The method of claim 1, wherein said determining the one or more corrective actions available to the one or more of the plurality of resource managers comprises sending a request for corrective actions to each of the plurality of resource managers, wherein the request for corrective actions identifies the service level objective.

3. The method of claim 1, wherein said selecting the corrective action of the one or more corrective actions comprises:
   determining a cost associated with each respective corrective action of the one or more corrective actions; and
   selecting the corrective action of the one or more corrective actions based, at least in part, on the cost associated with each respective corrective action of the one or more corrective actions.

4. The method of claim 3, wherein the cost associated with a corrective action of the one or more corrective actions is based, at least in part, on a ratio of an amount of a type of resource used for the corrective action to an amount of available resources of the type of resource.

5. The method of claim 3, wherein the cost associated with a corrective action of the one or more corrective actions is indicated by a resource manager of the plurality of resource managers associated with the corrective action.

6. A computer program product for handling a service level objective violation, the computer program product comprising:
   a non-transitory machine readable medium having program code embodied therewith, the program code to,
   receive, by a first resource manager, from a second resource manager, an indication of a service level objective violation;
   determine a first corrective action associated with the service level objective violation;
   determine, by the first resource manager, which of the first resource manager, the second resource manager, or a third resource manager should perform the first corrective action; and
   send, to a determined resource manager, an indication that the first corrective action should be performed, wherein the determined resource manager is the one of the first resource manager, the second resource manager, and the third resource manager that should perform the first corrective action.

7. The computer program product of claim 6, wherein the determined resource manager is the third resource manager, wherein the program code to send to the determined resource manager an indication that the first corrective action should be performed comprises program code to:
   send, from the first resource manager to the second resource manager, the indication that the first corrective action should be performed, wherein the indication that the first corrective action should be performed identifies the third resource manager as the determined resource manager;
   receive, by the second resource manager, the indication that the first corrective action should be performed;
   in response to reception, by the second resource manager, of the indication that the first corrective action should be performed, send, from the second resource manager to the third resource manager, the indication that the first corrective action should be performed.

8. The computer program product of claim 6, wherein the program code to determine the first corrective action associated with the service level objective violation comprises program code to:
   send, from the first resource manager to the second resource manager, a first request for available corrective actions;
   send, from the first resource manager to the third resource manager, a second request for available corrective actions; and receive, by the first resource manager from at least one of the second resource manager or the third resource manager, an indication of the first corrective action.

9. The computer program product of claim 6, wherein the program code to determine the first corrective action associated with the service level objective violation comprises program code to:
send, from the first resource manager to the second resource manager, a request for available corrective actions;
send, from the second resource manager to the third resource manager, the request for available corrective actions;
send, from the third resource manager to the second resource manager, an indication of the first corrective action; and
send, from the second resource manager to the first resource manager, the indication of the first corrective action.

10. The computer program product of claim 9, wherein the program code to determine the first corrective action associated with the service level objective violation further comprises program code to:
determine, by the second resource manager, that a cost associated with the first corrective action is less than a cost associated with a second corrective action;
wherein said program code to send, from the second resource manager to the third resource manager, the indication of the first corrective action comprises program code to send, from the second resource manager to the third resource manager, the indication of the first corrective action in response to a determination, by the second resource manager, that the cost associated with the first corrective action is less than the cost associated with the second corrective action.

11. The computer program product of claim 9, wherein the program code to determine the first corrective action associated with the service level objective violation further comprises program code to:
send, from the second resource manager to the first resource manager, an indication of a second corrective action; and
determine, by the first resource manager, that a cost associated with the first corrective action is less than a cost associated with the second corrective action.

12. The computer program product of claim 9,
wherein the program code to determine, by the first resource manager, which of the first resource manager, the second resource manager, or a third resource manager should perform the first corrective action comprises program code to:
determine, by the first resource manager, that the second resource manager or a resource manager associated with the second resource manager should perform the first corrective action;
send, from the first resource manager to the second resource manager, an indication that the corrective action should be performed by the second resource manager or by a resource manager associated with the second resource manager; and
in response to reception, by the second resource manager, of an indication that the corrective action should be performed by the second resource manager or by a resource manager associated with the second resource manager, determine, by the second resource manager, that the third resource manager should perform the corrective action;
wherein the program code to send, to the determined resource manager, the indication that the first corrective action should be performed comprises program code to send, from the second resource manager to the third resource manager, the indication that the first corrective action should be performed.

13. The computer program product of claim 6, wherein the program code further comprises program code to determine that the first resource manager, the second resource manager, and the third resource manager can take corrective action associated with the service level objective violation.

14. An apparatus comprising:
a processor; and
a machine readable medium having program code stored therein, the program code executable by the processor to cause the apparatus to,
register a plurality of resource managers;
receive an indication that a service level objective violation has occurred, wherein the service level objective violation is associated with a resource managed by at least one of the plurality of resource managers;
determine a plurality of corrective actions associated with the service level objective violation; and
delegate a first of the plurality of corrective actions to a first of the plurality of resource managers.

15. The apparatus of claim 14, wherein the indication that the service level objective violation has occurred is received from a second of the plurality of resource managers.

16. The apparatus of claim 14, wherein the program code being executable by the processor to cause the apparatus to determine the plurality of corrective actions associated with the service level objective violation comprises program code executable by the processor to cause the apparatus to:
request, from the plurality of resource managers, an indication of available corrective actions, wherein the request comprises an indication of the service level objective violation and an indication of the resource; and
in response to the request for the indication of available corrective actions, receive an indication of the first of the plurality of corrective actions.

17. The apparatus of claim 16, wherein the indication of the at least one of the plurality of corrective actions comprises an estimated cost of the first of the plurality of corrective actions, wherein the program code being executable by the processor to cause the apparatus to delegate the first of the plurality of corrective actions to the first of the plurality of resource managers comprises the program code executable by the processor to cause the apparatus to selecting the first of the plurality of corrective actions based, at least in part, on the estimated cost of the first of the plurality of corrective actions.

18. The apparatus of claim 17, wherein the estimated cost of the first of the plurality of corrective actions is based, at least in part, on a ratio of an amount of a type of resource to the amount of available resources of the type of resource.

19. The apparatus of claim 14, wherein the program code being executable by the processor to cause the apparatus to register the plurality of resource managers comprises the program code executable by the processor to cause the apparatus to receive, from the first of the plurality of resource managers, at least one of a registration request or a response to a discovery request.

20. The apparatus of claim 19, wherein the registration request or the response to the discovery request comprises an indication of the first of the plurality of corrective actions and an indication of a service level objective violation associated with the first of the plurality of corrective actions.

* * * * *